(12) United States Patent
Peisert

(10) Patent No.: US 6,759,015 B2
(45) Date of Patent: *Jul. 6, 2004

(54) INSULATED MOUNTING FOR A POLLUTION CONTROL DEVICE

(75) Inventor: Joseph C. Peisert, St. Paul, MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 540 days.

(21) Appl. No.: 09/274,639

(22) Filed: Mar. 23, 1999

(65) Prior Publication Data

US 2002/0031456 A1 Mar. 14, 2002

(51) Int. Cl.[7] .............................. B01D 53/34; F01N 7/14
(52) U.S. Cl. ........................ 422/179; 422/177; 422/180; 428/920
(58) Field of Search ................................ 422/179, 180, 422/221; 428/920, 921

(56) References Cited

U.S. PATENT DOCUMENTS

| | | | |
|---|---|---|---|
| 3,771,967 A | 11/1973 | Nowak | 422/179 |
| 3,892,537 A | 7/1975 | Gulati et al. | 422/179 |
| 4,011,651 A | 3/1977 | Bradbury et al. | 29/424 |
| 4,048,363 A | 9/1977 | Langer et al. | 428/77 |
| 4,239,733 A | 12/1980 | Foster et al. | 422/179 |
| 4,750,251 A | 6/1988 | Motley et al. | 29/890 |
| 4,782,661 A | 11/1988 | Motley et al. | 60/299 |
| 4,929,429 A | * 5/1990 | Merry | 422/179 |
| 5,008,086 A | 4/1991 | Merry | 422/180 |
| 5,250,269 A | 10/1993 | Langer | 422/179 |
| 5,332,609 A | 7/1994 | Corn | 428/77 |
| 5,380,580 A | 1/1995 | Rogers et al. | 428/219 |
| 5,580,532 A | 12/1996 | Robinson et al. | 422/179 |

FOREIGN PATENT DOCUMENTS

| | | |
|---|---|---|
| EP | 0 292 784 | 11/1988 |
| EP | 0 639 700 A1 | 2/1995 |
| EP | 0 824 184 | 2/1998 |

OTHER PUBLICATIONS

Patent Abstracts of Japan, vol. 010, No. 051 (M–457), Feb. 28, 1986 & JP 60 201020 A (Cyiyuuou Hatsujiyou KK), Oct. 11, 1985 abstract.

* cited by examiner

*Primary Examiner*—Hien Tran
(74) *Attorney, Agent, or Firm*—Jean A. Lown; Harold C. Knecht, III; Brian E. Szymanski

(57) ABSTRACT

A pollution control device that includes a housing, a pollution control element, and a sheet of mounting material. The mounting material is positioned around the monolith in a specific configuration to provide a tight fitting insulating wrap about the outer surface of the monolith. The sheet of mounting material is positioned such that at least a portion of the mating edges meet to form a seam that is non-perpendicular to the inlet and outlet of the monolith.

18 Claims, 2 Drawing Sheets

INSULATED MOUNTING FOR A POLLUTION CONTROL DEVICE

FIELD OF THE INVENTION

The present invention relates to mounting supports for pollution control devices, and more particularly to a sheet of mounting material suitable for wrapping a pollution control element of a pollution control device, and even more particularly to a sheet of mounting material having mating edges that form a seam at a non-perpendicular angle to the inlet and outlet of the pollution control element in a pollution control device.

BACKGROUND OF THE INVENTION

Pollution control devices are employed on motor vehicles to control atmospheric pollution. Catalytic converters and diesel particulate filters are two types of pollution control devices which are currently in widespread use. Both of these devices typically contain a monolithic structure mounted within a metal housing with a mounting material disposed between the structure and the walls of the housing. The monolithic structure, or monolith, is either made from metal or more commonly, a ceramic material.

Ceramic monoliths generally have very thin walls and are susceptible to breakage. Typically, a ceramic monolith has a coefficient of thermal expansion about an order of magnitude less than the metal housing in which it is contained. To avoid damage to the ceramic monolith from road shock and vibration, to compensate for the differences in thermal expansion of the monolith and housing, and to prevent exhaust gases from flowing between the monolith and metal housing, mounting materials are typically disposed between the ceramic monolith and the metal housing.

The mounting materials are generally manufactured in sheet form from ceramic fibrous materials. Pollution control devices employing mounting materials generally use a single sheet or mat with mating edges having either a tongue and groove configuration or a half lap configuration. The tongue and groove configuration includes a slot on one end of a mating edge and a tab on the opposing mating edge. The half lap configuration includes a tab on one half of the mating edge that corresponds to a slot on one half of an opposing mating edge. The sheet or mat is wrapped around the outer surface, or face, of the ceramic monolith with either the tongue and groove or half lap configuration engaged to form a seam in the mat. With either configuration, the tab must fit exactly into the slot to ensure a tight gas seal about the periphery of the ceramic monolith.

SUMMARY OF THE INVENTION

The diameter of individual ceramic monoliths will generally vary from a desired standard due to manufacturing constraints. Therefore, the circumference, or perimeter, of the monolith will also vary. This variance in monolith diameter means that the mat will tend to be either too long or too short as the individual ceramic monolith varies. An overlap of the mat can cause improper closure of the housing with the attendant risk of mounting failure or crushing of the ceramic monolith. An overlap is usually avoided by designing the mat length for a monolith having the minimum perimeter. This ensures that mat overlap will never occur, but it also means that the mat will often be too short and leave a space or gap where the two ends of the mat should come together. This space is undesirable because it provides an additional edge area on the mat for the exhaust gas to impinge upon. The open space may cause erosion or degradation of the insulating material, particularly at an exposed tab that is perpendicular to the flow of the gas stream. This space also allows a greater amount of heat to be conducted to the metal housing because hot exhaust gases come into direct contact with the metal housing and can eventually damage the housing.

Thus, existing techniques utilized for securing a mounting mat about an outer surface of a monolith typically include mating configurations that do not adequately compensate for the variations in diameter of individual monoliths. Additionally, existing techniques for securing the mat about the outer surface of the monolith result in gaps or spaces that expose the securing mechanism in the mounting mat to the direct flow of exhaust gases. The exposure of the securing feature of the mat to exhaust gas streams increases the potential for erosion of the mat and the subsequent failure of the pollution control device.

The present invention provides a pollution control device that includes a mounting material suitable for wrapping a pollution control element and securing the wrapped element within the pollution control device. The present invention is generally utilized in pollution control devices such as catalytic converters and diesel particulate filters.

The pollution control device of the present invention includes a housing and a monolith positioned within the housing. The monolith has an inlet, an outlet, and an outer surface. A sheet of mounting, having opposing mating edges, is positioned around the outer surface of the monolith between the monolith and housing. The sheet of mounting material is positioned such that at least a portion of the mating edges meet to form a seam that is non-perpendicular to the inlet and outlet of the monolith.

The mating edges of the present invention may be provided through several different embodiments. For example, one embodiment of the present invention includes a sheet of mounting material having opposing lateral edges, substantially parallel to each other, and opposing and edges, substantially parallel to each other. The end edges are at a non-perpendicular angle to the lateral edges. The end edges serve as the mating edges for the wrapped configuration. Thus, the mating edges of the mat when wrapped around an outer surface of a pollution control device, meet and form a seam that is non-perpendicular to the inlet and outlet of the pollution control device. Another embodiment of the invention includes the use of lateral edges as mating edges. In this embodiment, an elongated and narrow sheet of material is wrapped around the outer surface of the pollution control device with the lateral edges contacting opposing lateral edges to form a seam that is non-perpendicualr to the inlet and outlet of the pollution control element.

The seam formed by the mating edges of the present invention is at an angle that is non-perpendicular to the inlet and outlet of the pollution control device. This specific configuration enables the adjustment of the sheet of mounting material and reduces the exposure of the mating edge to the direct flow of the exhaust gases.

It is an advantage to utilize a sheet of mounting material that has a configuration that compensates for the size variance in individual monoliths. It is a further advantage to provide a sheet of mounting material that has a seam at a non-perpendicular angle to the flow of exhaust gases to reduce erosion and potential failure of the mounting material as a sealant layer.

BRIEF DESCRIPTION OF THE DRAWINGS

The invention will be more fully appreciated with reference to the following drawings in which similar reference numerals designate like or analogous components throughout and in which.

DETAILED DESCRIPTION OF THE INVENTION

Figure 1:
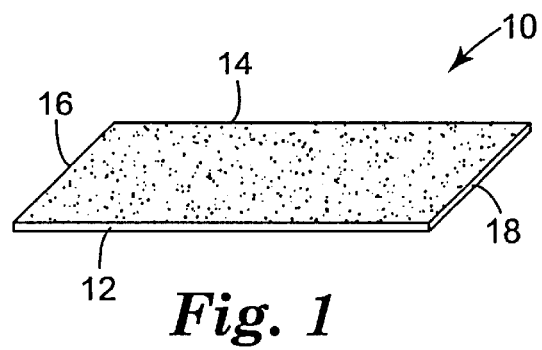
FIG. 1 is a perspective view of a sheet of mounting material in accordance with the present invention.

The present invention provides a pollution control device, which includes a housing, a pollution control element, and a sheet of mounting material. The mounting material is positioned around the outer surface of the monolith in a specific configuration which provides a tight fitting insulating wrap about the outer surface of the monolith. The pollution control devices of the present invention are suitable for use as catalytic converters or diesel particulate filters.

The housing is generally a metallic housing that is capable of withstanding the elevated operating temperatures of the pollution control device. The housing is preferably a stainless steel shell. Those skilled in the art recognize that the housing will take various shapes and forms. The particular style of the housing is dependent upon the selected monolith for a given application. Some common housing styles include, for example, clam shell housings, sleeve or cylinder housings, or shoe box housings.

The monolith utilized in accordance with the present invention is generally a ceramic or metal structure or a high temperature rigid filter. An example of a high temperature rigid filter is a ceramic foam filter for filtering molten aluminum. Suitable monoliths are known in the art and include those made of metal or ceramic. The monoliths or elements are used to support the catalyst materials for the converter. A useful catalytic converter element is disclosed, for example, in U. S. Pat. No. RE 27,747 (Johnson).

Further, ceramic catalytic converter elements are commercially available, for example, from Corning Inc. of Corning, NY, and NGK Insulator Ltd. of Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Emitec Co. of Germany.

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, NY, and NGK Insulator Ltd. of Nagoya, Japan.

The sheet of mounting material in the present invention is generally an insulating material that is capable of withstanding the elevated temperatures and gas flows of a pollution control device. In general, a sheet of mounting material is placed around the outer surface of a monolith to provide protection against vibration, maintain the position of the monolith in the housing, prevent exhaust gases from flowing between the monolith and housing, and compensate for differences in thermal expansion between the monolith and the housing. The sheet of mounting material produced in accordance with the present invention provides additional resistance to erosion from the flow of exhaust gases and compensates for size variations in individual monoliths from a standard monolith size.

The sheet of mounting material of the present invention is generally made of ceramic fibrous materials. Ceramic materials suitable for use as mounting materials in pollution control devices are generally recognized within the art. For example, ceramic materials suitable for use in the present invention include aluminosilicate, aluminum oxide, silicon oxide, magnesium oxide, zirconia, cordierite, silicon carbide and the like. Examples of suitable commercially available materials include Interam™ Automotive Mounting Mats from Minnesota Mining & Manufacturing Company of St. Paul, Minn.

The ceramic materials can include other additive materials conventionally recognized in the art. For example, intumescent materials are often added to the sheet of ceramic fibers so that the sheet of mounting material expands at elevated temperatures to compensate for the difference in expansion between the metallic housing and the monolith. Suitable intumescent materials include unexpanded vermiculite, vermiculite ore, hydrobiotite, water swellable synthetic tetrasilicic fluorine type mica described in U.S. Pat. No. 3,001,571, alkali metal silicate granules as described in U.S. Pat. No. 4,521,333 (Graham et al.), and expandable graphite. Suitable intumescent materials also include Expantrol™ granules available from Minnesota Mining & Manufacturing Co., St. Paul Minn. Preferred intumescent materials are unexpanded vermiculite, vermiculite ore, and expandable graphite.

In accordance with the present invention, the sheet of mounting material is configured with opposing mating edges. The mating edges are the edges of the sheet that meet to form a seam as the sheet is wrapped around the outer surface of the monolith. The sheet of mounting material of the present invention is configured to provide a tight fit about the outer surface of the monolith. The mating edges meet to create a seam that extends from a point near the inlet of the monolith to a point near the outlet of the monolith. The seam formed by the mating edges is non-perpendicular to the inlet and outlet of the monolith. The non-perpendicular angle of the seam and the three-dimensional features of the monolith create a helical seam about the periphery of the monolith. The non-perpendicular angle of the seam prevents the seam from being forced apart or opened by the flow of exhaust gases as the gases are directed into the inlet of the monolith.

Figure 2:
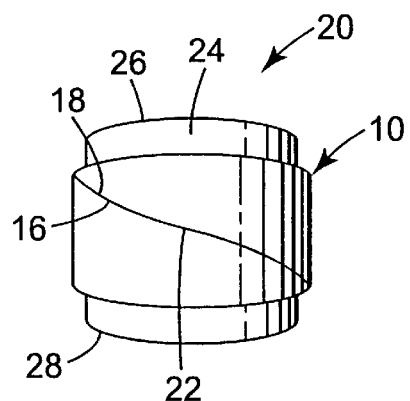
FIG. 2 is a perspective view of one embodiment of the present invention in which a monolith is wrapped with a sheet of mounting material.

The mating edges of the mounting material are determined by the specific embodiment of the present invention. One embodiment, depicted in FIG. 1, includes a sheet of mounting material 10 having opposing lateral edges 12, 14. The lateral edges 12, 14 are substantially parallel with each other. The sheet also includes opposing end edges 16, 18 that are substantially parallel to each other. The end edges 16, 18 are at a non-perpendicular angle to the lateral edges 12, 14. Preferably, the angle is within the range of about 15 degrees to about 75 degrees. In this configuration, the end edges 16, 18 serve as the mating edges of the invention. FIG. 2 illustrates the sheet of mounting material 10 positioned around the outer surface of a monolith 20. The end edges 16, 18 are positioned to form a seam 22 along the outer surface 24 of the monolith 20 that is non-perpendicular to the inlet 26 and outlet 28 of the monolith 20.

Individual monoliths can vary in size from a desired standard diameter. During production of the components for the pollution control device, the sheet of mounting material is produced to fit a standard sized monolith. Therefore, the sheet of mounting material does not always fit tightly about the outer surface of the monolith when center points of each mating edge are aligned. Thus, it is not always possible to have a sheet of mounting material that will have mating edges that properly meet and form a tight fitting sheet about the outer surface of the monolith. The configurations of the present invention are capable of adjusting to the size variations in the monolith and still provide a tight fit about the outer surface of the monolith. The configuration of FIG. 1 is capable of adjusting to size variations in the monolith by skewing the end edges 16, 18 from a center point of each edge.

Figure 3:
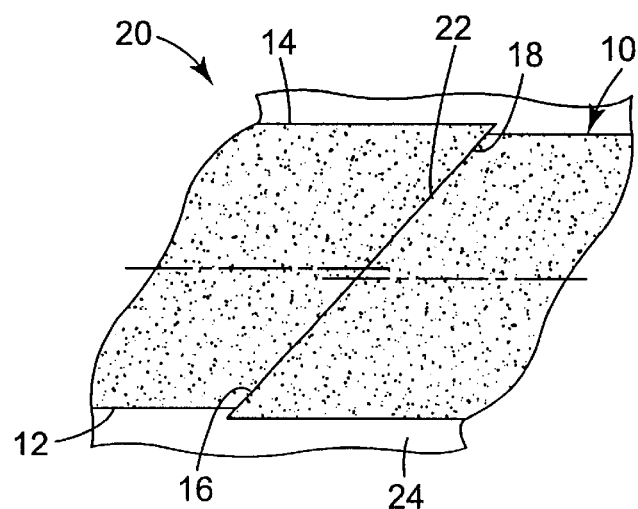
FIG. 3 is a segmented view of a sheet of mounting material having mating edges skewed from a center line of each mating edge.

FIG. 3 depicts opposing end edges with each end edge having a respective center point. The end edges 16, 18 function as the mating edges to form the seam 22 about the outer surface of the monolith 20. In this configuration, an adjustment for size variation in the monolith 20 is accomplished by moving the end edges 16, 18 in opposing directions along the outer surface 24 of the monolith 20 so that the respective center points no longer match up along the mating edge. The end edges 16, 18 are moved in opposing directions until the sheet of mounting material 10 fits tightly about the outer surface 24 of the monolith 20. The ability and extent of adjustment is dependent upon the specific configuration and the angle of the end edges 16, 18 to the adjacent lateral edges 12, 14 of the sheet of mounting material 10.

Figure 4:
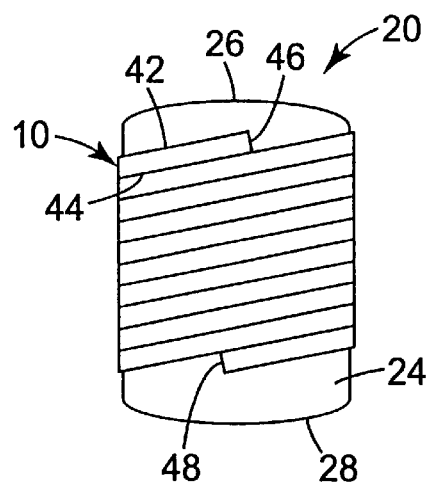
FIG. 4 is a another embodiment of the present invention utilizing lateral edges as the mating edges.

FIG. 4 is an example of another embodiment of the present invention. In this particular embodiment, the sheet of mounting material 10 is cut into an elongated narrow strip. The lateral edges 42, 44 serve as the mating edges as the sheet, or strip, of mounting material 10 is wrapped about the outer surface 24 of the monolith 20. One end edge 46 is positioned at the inlet 26 of the monolith 20 with the opposing end edge 48 ending at a position near the outlet 28 of the monolith 20 as the mounting material is wrapped around the monolith 10. The end edges 46, 48 may be tapered or angled so that they do not extend beyond the inlet 26 or outlet 28 of the monolith 20. This embodiment also compensates for the size variance in the monolith because the mounting material 10 is wrapped about the outer surface 24 of the monolith 20. The width and angle of application of the strip of mounting material will dictate the area of coverage of the outer surface of the monolith. Those skilled in the art are capable of selecting an appropriate width for the mounting material and applying at a non-perpendicular angle to maximize the insulated surface area of the outer surface of the monolith.

Upon positioning about the outer surface of the monolith, the sheet of mounting material is affixed in place with conventional attaching means including adhesive, pressure-sensitive adhesive tapes, staples, and the like. The attaching means can be temporary, in which case it could be removed prior to mounting the wrapped monolith in a catalytic converter or diesel filter. Suitable temporary materials include, but are not limited to, cardboard, flexible foam sheets, plastic sheets, and the like. The strip can also be permanent in which case it would be mounted into the converter or filter with the monolith.

Figure 5:
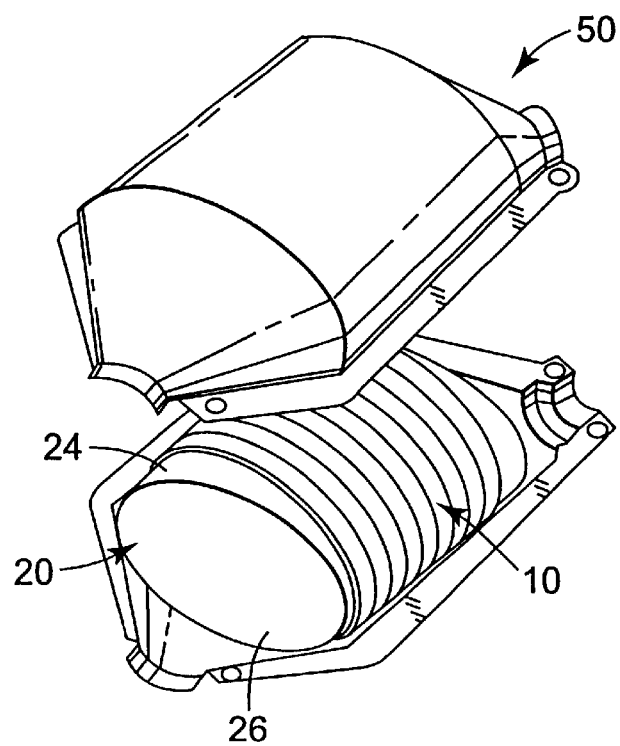
FIG. 5 is an exploded perspective view of a wrapped monolith of the present invention positioned within a housing.

As illustrated in FIG. 5, the monolith 20, having a sheet of mounting material 10 positioned about the outer surface 24 of the monolith 20, is then mounted within the housing 50. The housing 50 is then sealed, typically by welding the edges, to enclose the monolith 20. The sheet of mounting material 10 provides shock resistance and seals the monolith 20 to force the exhaust gas through the inlet 26 of the monolith.

The present invention both compensates for the size variation of the monolith and provides a seam that is non-perpendicular to the flow of exhaust gases. The present invention is capable of achieving the desired features with varying types and styles of monolith/housing configurations. Seams that are non-perpendicular to the flow of exhaust gases are not easily forced apart by the flow of exhaust gases as the leading mating edge shields all but the beginning portion of the seam. Further, the configuration of the present invention results in the leading mating edge being forced toward the opposing mating edge by the gas stream. Additionally, the ability of the present invention to adjust to size variations eliminates any opening or exposed tabs that create potential erosion points. The present invention results in an uninterrupted insulating surface about the outer surface of the monolith. Thus, the present invention eliminates the potential failure points of the conventional mating techniques.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A pollution control device, comprising:
   (a) a housing;
   (b) a pollution control element positioned within the housing, the pollution control element having an inlet; an outlet, and a face; and
   (c) a sheet of mounting material having opposing mating edges, the sheet of mounting material positioned around a majority of the face of the pollution control element between the pollution control element and the housing such that at least a portion of the mating edges meet to form a seam that is at a non-perpendicular angle to the inlet and the outlet of the pollution control element, the seam extends from a point near the inlet to a point near the outlet of the pollution control element, and the sheet of mounting material is capable of being adjusted to variations in the circumference of the element by moving the mating edges in opposing directions until the sheet of mounting material fits tightly about the face of the pollution control element to prevent exhaust gases from flowing between the pollution control element and housing.

2. A pollution control device as recited in claim 1, wherein said sheet of mounting material provides an uninterrupted insulating surface about the outer surface of said pollution control element.

3. A pollution control device as recited in claim 1, wherein said sheet of mounting material provides an uninterrupted insulating surface about the face of said pollution control element.

4. A pollution control device as recited in claim 1, wherein said mating edges are end edges of said sheet of mounting material.

5. A pollution control device as recited in claim 4, wherein said mating edges are at an angle in the range from about 15 degrees to about 75 degrees to the inlet.

6. A pollution control device as recited in claim 1, wherein said seam is not forced apart or opened by a flow of exhaust gases directed into the inlet of the pollution control element.

7. A pollution control device as recited in claim 1, wherein said mating edges are forced toward one another by a flow of exhaust gases directed into the inlet of the pollution control element.

8. A pollution control device, comprising:
(a) a housing;
(b) a pollution control element positioned within the housing, the pollution control element having an inlet an outlet and a face; and
(c) a sheet of mounting material having opposing mating edges that are end edges of the sheet of mounting material, the sheet of mounting material positioned around a majority of the face of the pollution control element between the pollution control element and the housing such that at least a portion of the mating edges meet to form a seam that is at a non-perpendicular angle to the inlet and the outlet of the pollution control element, the seam extends from a point near the inlet to a point near the outlet of the pollution control element the mating edges each have a center point and the mating edges are skewed from center such that the center points do not match up along the mating edges, in order to obtain a mating surface along a substantial portion of each mating edge and a tight fit of the sheet of mounting material about the outer surface of the pollution control element so that the sheet of mounting material is capable of being adjusted to variations in the circumference of the element and preventing exhaust gases from flowing between the pollution control element and housing.

9. A mounting mat for wrapping a pollution control element of a pollution control device, the mat comprising a sheet of mounting material having opposing lateral edges substantially parallel to each other, and opposing end edges substantially parallel to each other, and each of the opposing end edges being at a non-perpendicular angle to the lateral edges, wherein the mat has a surface area sufficient to cover and protect the pollution control element from shock and vibration damage.

10. An element as recited in claim 9, wherein said non-perpendicular angle is within the range of about 15 degrees to about 75 degrees.

11. A sheet of mounting material for wrapping a pollution control element in a pollution control housing, the pollution control element having an outer circumference to be wrapped, the sheet of mounting material having opposing mating end edges, each of the mating edges having a center point and the mating edges being configured such that as the sheet of mounting material is positioned around the outer circumference of the pollution control element within the pollution control housing, at least a portion of the mating edges meet to form a seam that is at a non-perpendicular angle to an inlet and an outlet of the pollution control element, wherein the sheet of mounting material has a length between the center points of the mating edges that is shorter than the outer circumference of the pollution control element and that would leave a space or gap between the mating edges if the center points were aligned.

12. A sheet of mounting material as recited in claim 11, wherein said non-perpendicular angle is within the range of about 15 degrees to about 75 degrees.

13. A sheet of mounting material as recited in claim 11, wherein said pollution control element has an outer surface to be wrapped and said sheet has sufficient area to wrap a majority of said outer surface.

14. A pollution control device, comprising:
(a) a housing;
(b) a pollution control element positioned within said housing, said pollution control element having an inlet, an outlet, and a face; and
(c) a sheet of mounting material having opposing lateral mating edges, said mounting material being positioned around the face of said pollution control element within said housing such that at least a portion of said lateral mating edges meet to form a helical seam around said pollution control element.

15. A pollution control device as recited in claim 14, wherein said sheet of mounting material provides an uninterrupted insulating surface about the face of said pollution control element.

16. A pollution control device, comprising:
(a) a housing;
(b) a pollution control element positioned within the housing, the pollution control element having an inlet, an outlet, a face; and a circumference that can vary from a desired standard size; and
(c) a sheet of mounting material having opposing mating edges, the sheet of mounting material being positioned round the face of the pollution control element and within the housing such that at least a portion of the mating edges meet to form a seam that is at a non-perpendicular angle to the inlet and the outlet of the pollution control element;
wherein the mating edges each have a center point and the mating edges are skewed from center such that the center points do not match up along the mating edges in order, despite variations in the circumference of the element, to obtain a mating surface along a substantial portion of each mating edge and to prevent exhaust gases from flowing between the pollution control element and housing.

17. A pollution control device as recited in claim 16, wherein said mating edges are at an angle in the range from about 15 degrees to about 75 degrees from the inlet.

18. A pollution control device as recited in claim 16, wherein the sheet of mounting material is dimensioned such that if it were wrapped around the pollution control element and the center points were aligned, there would be a gap between the mating edges.

* * * * *

UNITED STATES PATENT AND TRADEMARK OFFICE
CERTIFICATE OF CORRECTION

PATENT NO. : 6,759,015 B2
DATED : July 6, 2004
INVENTOR(S) : Peisert, Joseph C.

It is certified that error appears in the above-identified patent and that said Letters Patent is hereby corrected as shown below:

Column 2,
Line 28, after "mounting" insert -- material --;
Line 38, delete "and edges", insert in place thereof -- end edges --;
Line 42, after "mat", insert -- , --;
Line 49, delete "non-perpendicualr", insert in place thereof -- non-perpendicular --;

Column 6,
Line 36, delete " ; ", insert in place thereof -- , --;
Lines 59-61, delete "sheet of mounting material provides an uninterrupted insulating surface about the face of said pollution control element", and insert -- mating edges are lateral edges of said sheet of mounting material --;

Column 7,
Line 11, after "inlet", insert -- , --;
Line 12, after "outlet", insert -- , --;
Line 23, after "element", insert -- , --;

Column 8,
Line 43, after "edges", insert -- , --;
Line 44, delete "circumference", insert in place thereof -- circumferences --;

Signed and Sealed this

Sixteenth Day of November, 2004

JON W. DUDAS
*Director of the United States Patent and Trademark Office*